3,211,668
REJUVENATION OF NITROGEN COMPOUND-POISONED CATALYSTS
Sachio Yamamoto, El Cerrito, Calif., assignor to California Research Corporation, San Francisco, Calif., a corporation of Delaware
No Drawing. Filed Jan. 30, 1963, Ser. No. 255,067
3 Claims. (Cl. 252—411)

This invention relates to a method of rejuvenating acidic catalysts deactivated by contact with basic nitrogen compounds, and, more particularly, to a rejuvenation method employing relatively large quantities of an inert gas.

Acidic composites have been, and are presently, used as catalytic agents for promoting a variety of chemical reactions. Thus, naturally occurring or synthetic acidic composites, for example, acid activated clays and aluminas, synthetic silica-aluminas, silica-magnesias and the like, are excellent for promoting the catalytic cracking of petroleum fractions. Also, such composites have found wide use as catalyst supports for hydrogenating-dehydrogenating components (e.g., metals and compounds of Groups VI and VIII of the periodic table) with the resulting catalysts employed in the hydrofining and/or hydrocracking or reforming of petroleum distillates. In such reactions, after a period of continued on-stream use, the catalysts universally lose some or all of their activity. Often, this overall loss in catalytic activity can be attributed to two distinct phenomena that occur within the reaction zone. One of these deactivating effects is due to the formation of carbonaceous deposits (coke) on the catalyst. The deactivating effect of coke on the catalyst is due almost entirely to the physical masking of the acid sites within and on the catalyst by a layer of coke. Reactivation (generally referred to as regeneration) of a coke deactivated catalyst can almost always be accomplished by burning the coke in the presence of an oxygen-containing gas at elevated temperatures.

The other type of deactivation discussed herein is quite a different matter. Petroleum fractions used as feedstocks to catalytic cracking, hydrofining, and hydrocracking units contain organic nitrogen-containing compounds varying in concentration from extremely small to extremely large quantities. These nitrogenous compounds are basic and titrate the acid sites of the catalyst thereby neutralizing the acidity necessary for the cracking reaction. The present invention is directed to a method of rejuvenating catalysts deactivated in the latter manner.

According to the present invention, a nitrogen compound-poisoned acidic catalyst is at least partially rejuvenated by the method comprising contacting said poisoned catalyst with at least 1000 volumes of an inert gas per volume of catalyst at a temperature of at least 800° F.

At the outset, the present method must be contrasted with the techniques employing inert gases for catalyst treating within reaction zones suggested in the prior art. For example, in the catalytic cracking of hydrocarbon fractions in moving bed and fluid bed units, it is conventional practice to contact the spent catalyst passing out of the reactor (at or near reactor total pressure), and before it is sent to the regenerator, with an inert gas. Generally, the inert gas is steam, but other inert gases such as flue gas, nitrogen, etc., have also been suggested. The purpose of this operation is to remove (or strip) entrained or adsorbed volatilizable material from the catalyst so that excessive losses of the feedstock are avoided and to reduce the amount of heat which would otherwise be liberated when the catalyst is burned in the regenerator. This stripping step is a physical displacement of the volatilizable hydrocarbons and is done with a small quantity of gas, well below 10 volumes of inert gas per volume of catalyst even at temperatures below 1000° F.

In contrast with a stripping operation, the method of the present invention requires, among other critical conditions, considerably more inert gas contacting the nitrogen compound-poisoned catalyst than is necessary, let alone economic, in the simple stripping step practiced in such plants as catalytic crackers. In order to successfully rejuvenate a nitrogen compound-poisoned acidic catalyst, there must be a coordination of inert gas volume and temperature during the contacting operation.

It has been found that to attain a reasonable rejuvenation of nitrogen compound-poisoned catalysts, the catalyst must be contacted with at least 1000 volumes of inert gas per volume of catalyst (measured at the temperature and pressure employed in the rejuvenation) at a temperature of at least 800° F. Further, it has been found that the higher the inert gas temperature, less gas is needed to effect rejuvenation, but in no case should the inert gas volume be less than about 1000 volumes per volume of catalyst. Thus, partial rejuvenation of poisoned catalyst can be obtained with this volume of inert gas at 800° F. At 900° F., complete rejuvenation of the same poisoned catalyst can be had with the same 1000 volumes of inert gas per volume of catalyst. In order to get complete rejuvenation at 800° F., about 10,000 volumes per volume of catalyst are needed. At temperatures above 900° F., it still takes about 1000 volumes of inert gas to rejuvenate the catalyst. These higher temperatures (above about 1200° F.) should normally be avoided because damage to the catalyst can result, as by sintering, especially with catalysts having metals (or compounds of metals) such as nickel or cobalt as catalytic agents. Therefore, the preferred range of temperature for the inert gas contact lies between about 800° and 1200° F. and the preferred amount of inert gas used in the contact will lie in the range of from a minimum of about 1000 to a maximum of 10,000 volumes of gas per volume of catalyst. Since the amount of inert gas is the important matter (along with temperature), the contact time can vary over a wide range. Thus, a low, inert gas space velocity will require a much longer rejuvenation time than a high gas space velocity. Subatmospheric, atmospheric or superatmospheric pressures can be employed for rejuvenation.

Although any inert gas can be employed to advantage, it is preferred to employ essentially water vapor-free inert gases such as natural gas, carbon dioxide, flue gas, nitrogen and/or helium. Nitrogen itself won't poison the catalyst; only such compounds thereof as ammonia and naturally occurring organic, nitrogen-containing compounds that occur in petroleum, shale oil and liquid coal fractions. The gas is preferably water vapor-free inasmuch as the catalyst may be physically damaged at the contact temperatures employed.

The subject method will rejuvenate acidic catalysts of the type described above. However, the method is particularly suited to the rejuvenation of catalysts wherein at least a portion of the catalyst acidity is imparted by a silicious component of the catalyst.

*Example 1*

A hydrocracking catalyst composed of 6 weight percent (as the metal) nickel sulfide disposed on a silica-alumina cracking catalyst support (about 90 weight percent silica and about 10 weight percent alumina) was poisoned by contact with ammonia so that its hydrocracking activity was essentially zero due to titration of the acid sites. This catalyst was then contacted with helium at 1 atmosphere pressure, 800° F. at a space rate of 9400 volumes of helium per volume of catalyst per hour (v./v./hr.). After two hours the catalyst had completely regained its initial, fresh hydrocracking activity.

Example 2

Another sample of the poisoned catalyst described in Example 1 was contacted with helium under identical conditions except the temperature was 900° F. After only about 40 minutes of contact, 60 percent of the initial, fresh hydrocracking activity was restored.

Example 3

Another sample of the catalyst described in Example 1 was contacted with nitrogen at one atmosphere pressure, a temperature of 885° F., and a space velocity of 9400 v./v./hr. After two hours, 80 percent of the initial catalyst hydrocracking activity was restored.

The rejuvenation operation herein disclosed can be utilized in many existing conversion processes where nitrogen compounds deactivate the catalyst. However, such an operation will not remove appreciable amounts of coke from catalysts. Therefore, in catalytic processes where coke laydown on the catalyst is not a factor, and where nitrogen compound poisoning is, the rejuvenation method herein described can be employed as the sole reactivating process. In conversion units where both coke and nitrogen compound deactivation is a problem, the rejuvenation method can be solely employed until coking of the catalyst becomes critical, at which point conventional coke burning regeneration can be done. Thus, this inert gas rejuvenation method can replace or be an adjunct to coke removal operations. For example, where such nitrogen bases have an adverse effect on catalytic cracking units, this rejuvenation contacting step can be employed in lieu of the coke burning (regeneration) step before the catalyst is returned to the reaction zone until coke deactivation occurs. Or, in the same type of unit, a slipstream of catalyst could be continually removed from the system, rejuvenated in the manner described, and then returned to the cracking operation. In hydrocracking systems, the rejuvenation step can also be performed in place of regeneration (coke removal) until the catalyst is coke deactivated. Another particular application of the rejuvenation step is the replacement, or at least a reduction in the severity, of a feed pretreating step now practiced in hydrocracking. Thus, U.S. Patent 2,944,006 (Scott) describes a hydrocracking process wherein it is necessary to hydrofine or otherwise reduce the nitrogen-compound content of the feed to the hydrocracking zone because of the deactivating effect of such compounds on the catalyst. By removing these compounds, the catalyst has a long on-stream life since coke formation is not an important problem. The rejuvenation step of the present invention can eliminate or reduce the severity of the feed pretreatment step considered so necessary. This can be done by feeding the nitrogen compound-containing feed to the hydrocracking zone until appreciable titration of the catalyst and sites results in a loss of catalyst activity. At this point, the hydrogen recirculating within the system can be replaced with the particular inert gas used for rejuvenation at the system temperature and pressure. The oil and hydrogen would first be purged from the reaction zone by the inert gas, as described in the prior art. The temperature and pressure of the catalyst can then be adjusted to that desired for rejuvenation, and the rejuvenation accomplished by passing the required amount of inert gas over the actalyst, either by once-through operation or by recycling the gas. Following rejuvenation, the temperature and pressure can be regulated to that used in the hydrocracking reaction, and then the feed and hydrogen can be reintroduced to the reaction zone.

Another modification is to employ moving bed or fluid hydrocracking catalyst with a rejuvenation operation performed after the catalyst leaves the reactor, much the same as in a catalytic cracking unit briefly described above.

It is apparent that numerous variations in the operation of the rejuvenation method could be made without departing from the spirit of the invention, and all such variations that fall within the scope of the appended claims are intended to be embraced thereby.

I claim:

1. A method for rejuvenating a catalyst that contains, as a necessary component, a solid, acidic composite possessing catalytic cracking activity attributable to the presence of acid sites upon said composite, said catalyst having been deactivated by titration of said acid sites by contact with a basic nitrogen-containing compound thereby at least partially neutralizing said acid sites and reducing said catalysts cracking activity, said method comprising contacting the deactivated catalyst with at least 1000 volumes of an inert gas per volume of catalyst at a temperature of at least 800° F.

2. The method of claim 1 wherein the inert gas is essentially free of water vapor.

3. The method of claim 1 wherein the acidity is imparted to said catalyst by the presence, in said composite, of appreciable amounts of silica.

References Cited by the Examiner

UNITED STATES PATENTS

| | | | |
|---|---|---|---|
| 2,419,470 | 4/47 | Teter | 252—411 |
| 2,500,776 | 3/50 | Teter | 252—411 |
| 2,562,334 | 7/51 | Roberts | 252—411 |
| 2,618,074 | 11/52 | Trainer et al. | 252—411 |
| 2,814,650 | 11/57 | Clark | 252—411 |

MAURICE A. BRINDISI, *Primary Examiner.*